United States Patent [19]
Dietiker

[11] Patent Number: 5,215,115
[45] Date of Patent: Jun. 1, 1993

[54] GAS VALVE CAPABLE OF MODULATING OR ON/OFF OPERATION

[75] Inventor: Paul Dietiker, Redondo Beach, Calif.

[73] Assignee: Honeywell Inc., Minneapolis, Minn.

[21] Appl. No.: 816,512

[22] Filed: Dec. 31, 1991

[51] Int. Cl.$^5$ ............................................. F16K 31/40
[52] U.S. Cl. .................................. 137/492.5; 137/495
[58] Field of Search ....................... 137/489, 492.5, 495

[56] References Cited

U.S. PATENT DOCUMENTS

| | | | |
|---|---|---|---|
| 3,447,775 | 6/1969 | Katchka et al. | 137/489 |
| 3,502,101 | 3/1970 | Willson et al. | 137/495 |
| 3,545,472 | 12/1970 | Franz | 137/495 X |
| 3,592,225 | 7/1971 | Graham et al. | 137/495 |
| 3,796,229 | 3/1974 | Wright | 137/495 |
| 4,217,928 | 8/1980 | Kelly | 137/495 |

Primary Examiner—Stephen M. Hepperle
Attorney, Agent, or Firm—Charles L. Rubow

[57] ABSTRACT

A gas valve having a main valve closure member carried by a first diaphragm biased to close the main valve, the first diaphragm being exposed on opposite sides to gas supply pressure and to pressure in a control chamber. The control chamber is connected to the main valve outlet through a normally closed control valve, whose position is primarily determined by an electromagnetic voice coil, in series with a normally open control valve, whose position is primarily determined by a second diaphragm exposed to the valve outlet pressure.

9 Claims, 3 Drawing Sheets

GAS VALVE CAPABLE OF MODULATING OR ON/OFF OPERATION

BACKGROUND OF THE INVENTION

The invention broadly relates to control valves, and is specifically directed to an electrically controlled gas valve capable of modulating or on-off operation.

Gas valves are commonly used throughout the world to control fuel flow to a variety of gas burning appliances, such as furnaces and boilers. Due to the dangers inherent in natural gas and its use in residential, commercial and industrial applications, many safety requirements have been promulgated by various regulatory agencies. Not all requirements exist in all countries. Therefore, it is somewhat difficult to design and manufacture a valve suitable for global or international use.

One of the safety requirements that exists in some but not all countries is the capability to reliably regulate and/or shut off fuel flow to an appliance in high "backpressure" situations. A straight forward solution to the problem is to provide a strong seal force, which may be produced by a spring or other biasing device.

The difficulty with this solution, particularly in a modulating valve, is that a commensurately large controlling force is required to open and control the valve. The problem is compounded somewhat by the fact that many gas valves, particularly for residential use, are controlled by an electric signal. With a modest electrical current, it is difficult to generate a force that not only is capable of overcoming a strong biasing force, but is also capable of effecting accurate flow control.

The inventive gas valve overcomes these problems in a unique manner by utilizing an electrically conductive winding that functions as a speaker coil to generate a magnetomotive force that can be used either to modulate the main flow valve or to operate it in an on-off manner.

The force generated by the voice coil is not used directly to oppose the spring biasing force that maintains the main flow valve in a closed position. Rather, it is used to operate a smaller control valve that in turn determines the pressure acting against a diaphragm that controls the main control valve.

In the preferred embodiment, two small control valves, one normally closed and one normally open, act in concert over a range of movement in response to the thermostatically controlled electric current signal to position the main control valve as a function of demand. The valve operates uniquely to provide a maximum flow of gas when the electric current signal reaches a threshold level, and to thereafter reduce the output gas flow linearly as a function of the increasing electric current signal.

The modulating operation of the main flow valve may be easily changed by eliminating a mechanical linkage between the two control valves, which changes the main flow valve to on-off operation mode that is common in many residential appliances, such as furnaces.

The inventive valve is small, compact and relatively simple, while at the same time satisfying the various safety requirements of most countries, thus permitting global use.

DESCRIPTION OF THE PREFERRED EMBODIMENT

Figure 1:
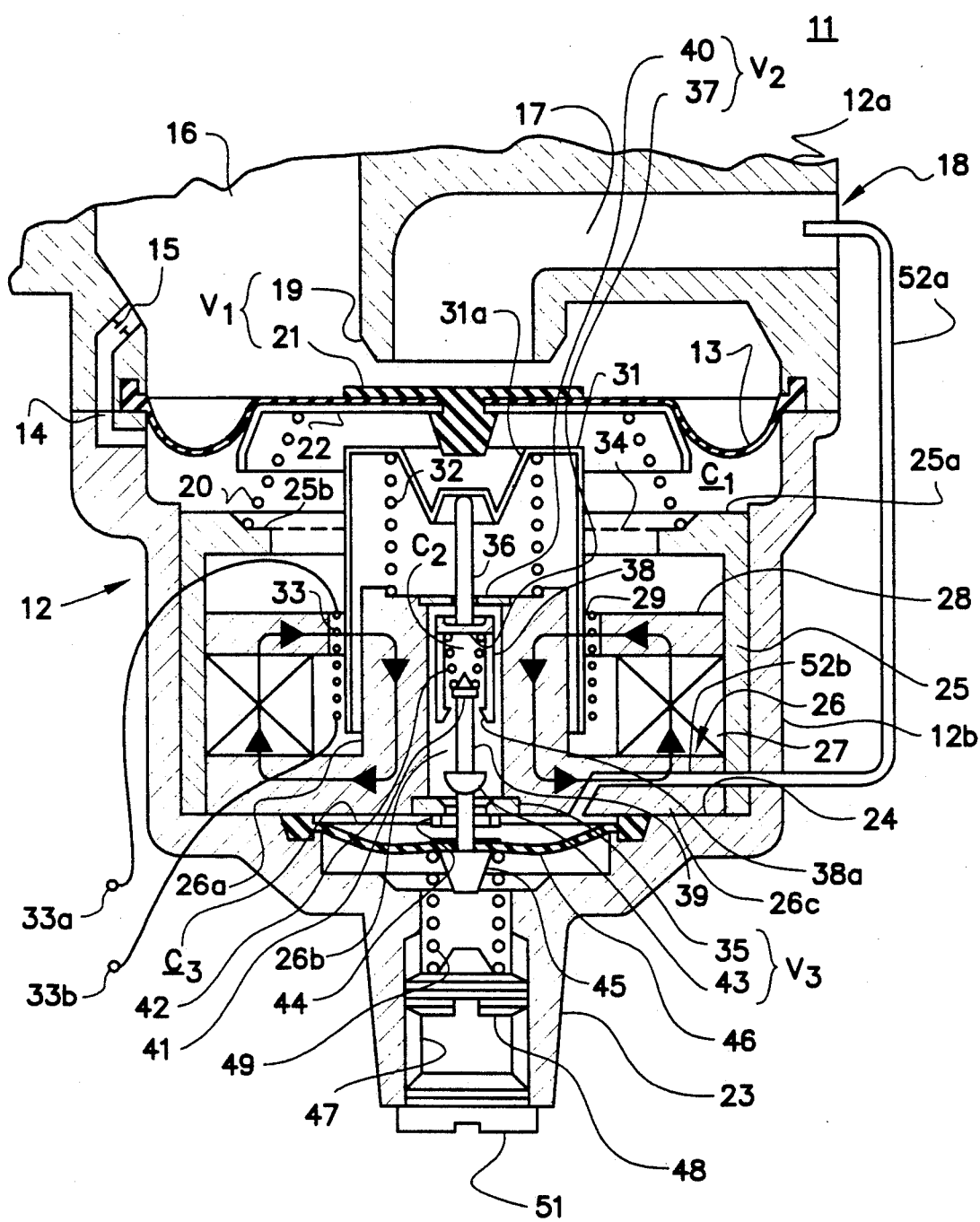
FIG. 1 is a partial sectional view of a gas valve in accordance with the applicant's invention, adapted for modulating operation, and shown in an open state to permit gas flow.
Figure 2:
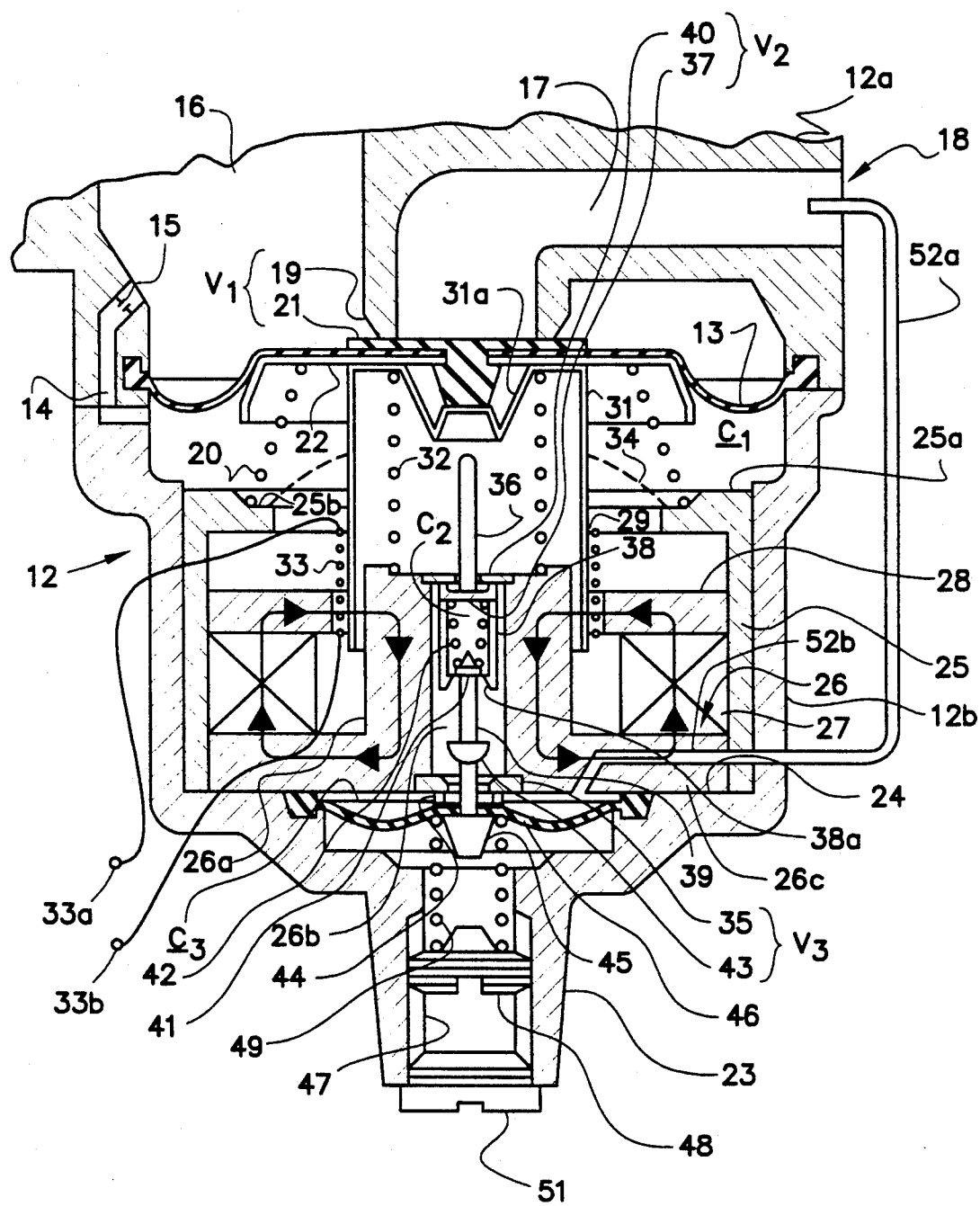
FIG. 2 is a view similar to FIG. 1, with the valve in a closed state.

With reference to FIGS. 1 and 2, a gas modulating valve embodying the invention is generally identified by reference numeral 11. Valve 11 has a housing 12 consisting of an upper housing 12a and a lower housing 12b between which a flexible, resilient diaphragm 13 is clamped. An orifice passage 14 including an orifice 15 bypasses diaphragm 13 to establish restricted fluid flow between opposite sides of the diaphragm.

Upper housing 12a defines an inlet passage 16 adapted for connection to a source of natural gas and an outlet passage 17 leading to an outlet 18. As will be further described in connection with FIG. 3, inlet passage 16 may be connected to the gas source through a safety valve which forms a part (not shown) of valve 11. A gas valve including such a safety valve is shown and described in detail in U.S. Pat. No. 4,543,974 issued Oct. 1, 1985 jointly to the inventor of the present invention and others. Outlet 18 is adapted for connection and provides a variable flow of natural gas to an appliance such as a furnace or a boiler.

The internal structure of housing 12a defines an annular seat 19 between the inlet passage 16 and outlet passage 17 that is centered relative to the diaphragm 13. Diaphragm 13 carries a valve closure member 21 constructed and arranged to engage and seal the seat 19 in the "off" mode shown in FIG. 2, which prevents the supply of gas to the appliance. An annular backing member 22 is carried by the closure member 21 in adjacent reinforcing relation to the underside of diaphragm 13 and closure member 21.

As indicated in the figures, the seat 19 and closure member 21 together constitute a valve $V_1$.

Lower housing 12b is generally cylindrical but includes several irregular steps of reduced diameter and terminates in a downward projection 23. Internally, the lower housing 12b defines a flat annular surface 24 that receives and supports first and second insert members 25, 26. Insert member 25 is generally cylindrical, but its upper edge terminates in an inward radial flange 25a the inner and upper edge of which defines an annular step 25b. A conical spring 20 is disposed in compression between the annular step 25b and the lower surface of backing member 22 to normally urge the closure member 21 into engagement with seat 19.

Second insert member 26 is irregular in shape and has a lesser axial depth than insert member 25. It is formed from a ferromagnetic material that is capable of magnetic conductance in an electromagnetic circuit. It includes a cylindrical core 26a having an axial bore 26b formed therethrough and an annular base 26c that rests on the annular surface 24.

A permanent magnet 27 of annular or ring configuration rests on the top surface of base 26c, and a third insert member 28, also of annular or ring configuration, rests on the magnet 27. As shown in the drawings, the outer diameter of the annular insert member 28 is the same as that of the permanent magnet 27 and annular base 26c. Its inner diameter is chosen to define an annular gap 29 with the outer cylindrical surface of core 26a.

A tubular actuator member 31 has a closed top and open bottom, and is sized to fit over and reciprocally slide within gap 29 relative to the core 26a. As best shown in FIG. 2, the upper closed end of actuator member 31 is formed with a recess 31a sized and configured to receivably engage the closure member 21 and backing member 22. A flat guide spring 34 is interconnected between an intermediate point on the outer surface of actuator member 31 and the annular step 25b to ensure centered engagement on the closure member 21.

A coil spring 32 is disposed in compression between the upper end of core 26a and the undersurface of the closed upper end of actuator member 31 to normally urge it upward into engagement with closure member 21. In the absence of other forces, the springs 20, 32 urge the closure member 21 into sealable engagement with the seat 19 so that valve $V_1$ is closed.

An electrically conductive winding 33 is disposed on the lower portion of actuator member 31 and functions as a speaker coil to generate a magnetomotive force as described in further detail below. Coil 33 includes terminals 33a and 33b that are adapted for connection to a variable current signal generated by an electric or electronic control device such as an electronic thermostat (not shown).

When an electric current passes through the coil 33, it crosses the magnetic flux lines created by permanent magnet 27, the flux lines being illustrated by the arrows as shown in the figures. The magnetomotive force generated is a function of the magnitude of magnetic flux, the length of the conductor defining the coil 33 and the magnitude of current passing through the coil. However, it will be observed that the axial dimension of the coil 33 is greater than the axial thickness of the third insert member 28. Throughout the entire axial movement of the actuator member 31, the number of windings of coil 33 which are exposed to the inner edge of third insert member 28 in completing the magnetic circuit remains the same. As such, the magnetomotive force imparted on actuator member 31 varies only with current.

With continued reference to the drawings, a small retaining washer 40 is secured to the upper end of core 26a in partial overlying relation to the bore 26b. A similar but larger annular retainer 35 is disposed at the bottom of bore 26b.

An actuator stem 36 projects through the washer 40 and carries a valve closure member 37 at its lower end that is constructed to sealably engage the underside of washer 40. Components 40, 37 constitute valve $V_2$ as shown in the drawings.

A tubular member 38 projects axially downward from the closure member 37 and terminates in a barbed stop 38a. A second stem member 39 carries a spring retaining stop 41 at its upper end that is received within the tubular member 38 and sized to engage the stop 38a. A coil spring 42 is disposed in compression between closure member 37 and stop 41. A hemispherical closure member 43 is secured to stem 39 intermediate its ends, and is sized and configured to sealably engage the top surface of retainer 35, which accordingly functions as a valve seat. The components 35, 43 together constitute valve $V_3$.

A small annular limit stop 44 is secured to the undersurface of retainer seat 35. A stop member 45 is carried at the extreme lower end of stem member 39 and is engageable with limit stop 44

A resilient, flexible diaphragm 46 is sealably disposed between valve $V_3$, and the lower end of housing 12b. Diaphragm 46 is secured to and moves with stop member 45

A threaded bore 47 is formed in the housing projection 23. An adjustable spring retaining screw 48 is disposed in bore 47, and a spring 49 is disposed in compression between stop member 45 and the retaining screw 48. A threaded plug 51 closes the lower end of threaded bore 47

As constructed, diaphragms 13, 46 and valves $V_2$, $V_3$, together with other internal structural elements, define chambers $C_1$, $C_2$ (which is the same as bore 26b) and $C_3$.

A small conduit 52a senses output pressure in the outlet passage 17 and communicates it through an internal passage 52b to chamber $C_3$.

In operation, valve 11 occupies the closed position shown in FIG. 2 when no control signal is received at the terminals 33a, 33b of coil 33. In this position, valve $V_1$ is closed under the influence of conical spring 20 and coil spring 32, valve $V_2$ is closed by springs 42 and 49, and valve $V_3$ is open.

Natural gas is supplied to the inlet 16 at a constant pressure, a portion of which bleeds through orifice 15 and orifice passage 14 into chamber $C_1$. With valves $V_1$, $V_2$ closed, the pressure equalizes between inlet 16 and chamber $C_1$, and springs 20, 32 maintain valve $V_1$ in its closed position.

With no outlet pressure in outlet passage 17, pressure in chambers $C_2$ and $C_3$ (to the extent pressure exists) is exhausted. Gas pressure in chamber $C_2$ passes through open valve $V_3$ into chamber $C_3$ (stop 44 is segmented to permit gas flow even with stop member 45 in the position shown), and pressure in chamber $C_3$ exhausts through passages 52a, 52b. With chamber $C_3$ at zero pressure, spring 49 maintains diaphragm 46 and stem 39 in the position shown in FIG. 2. As such, valve $V_3$ is maintained in its fully open position, and the stem 39 acting through spring 42 maintains $V_2$ in a closed position.

With the initial application of an electrical current signal at terminals 33a, 33b, coil 33 generates a magnetomotive force as earlier described which initially moves actuator 31 downward. However, as long as actuator 31 does not engage and move stem 36 downward, valve $V_2$ remains closed and valve $V_3$ remains open. Gas pressure in inlet 16 and chamber $C_1$ remains equalized, and although actuator 31 has moved away from diaphragm 13, conical spring 20 continues to maintain diaphragm 13 in the position shown in FIG. 2, and valve $V_1$ remains closed.

With an incrementally greater current signal, actuator 31 engages stem 36 to open valve $V_2$. With valve $V_2$ only incrementally open, and with valve $V_3$ still essentially fully open, gas pressure in chamber $C_1$ is immediately communicated through valve $V_2$ to chamber $C_2$, and from there to chamber $C_3$ and outlet passage 17. With this reduced pressure in chamber $C_1$, inlet pressure in passage 16 forces diaphragm 13 downward, opening valve $V_1$ and supplying the appliance with gas through outlet 18.

The magnitude of pressure in outlet passage 17 is communicated back through passages 52a, 52b into chamber $C_3$ and acts on diaphragm 46, which tends to pull stem 39 downward. For a control signal in coil 33 of predetermined magnitude, valves $V_2$, $V_3$ will establish a balanced position as a function of the spring force as generated by springs 42, 49 and the pressure sensed by diaphragm 46. This in turn establishes a pressure differential across diaphragm 13 resulting in modulated control of valve $V_1$.

More specifically, the output pressure in outlet passage 17 is at its maximum when actuator 31 has just engaged stem 36 to initially open valve $V_2$. Prior to movement of the actuator 31, valve $V_2$ has been in a closed position, and gas pressure in the inlet 16 and chamber $C_1$ has equalized through the orifice passage 14, and springs 20, 32 maintain valve $V_1$ in a closed position. As soon as actuator 31 engages stem 36 and moves it downward, valve $V_2$ opens, immediately exhausting pressure from chamber $C_1$ into chamber $C_2$, and since $V_3$ is open, such pressure is also exhausted into chamber $C_3$. Since the pressure in chambers $C_2$ and $C_3$ enables the gas pressure in inlet 16 to act against diaphragm 13, opening valve $V_1$. This position results in the least operational pressure in chamber $C_1$ and thus represents the maximum opening of modulating valve $V_1$.

With a control signal of increased magnitude at terminals 33a, 33b, actuator 31 progressively moves stem 36 downwardly, which progressively opens valve $V_2$ and closes valve $V_3$. As indicated above, the valves $V_2$, $V_3$ establish a balanced position as a function of the spring force generated by springs 42, 49 and the pressure sensed by diaphragm 46, which in turn establishes a pressure differential across diaphragm 13 that modulates the a opening of valve $V_1$. Because of the progressive opening of valve $V_2$ and closing of valve $V_3$ with downward movement of stem 36, the pressure differential across diaphragm 13 commensurately decreases, and valve $V_1$ progressively closes. The outlet pressure in outlet passage 17 decreases in an essentially linear manner. When the control signal at terminal 33a, 33b reaches its maximum, actuator 31 is drawn downward to its maximum position, fully opening valve $V_2$ and moving valve $V_3$ to complete closure. In this position, pressure in chambers $C_1$ and $C_3$ becomes equalized with the pressure in inlet passage 16, and springs 20, 32 move diaphragm 13 upward to the point of closure of valve $V_1$.

Figure 3:
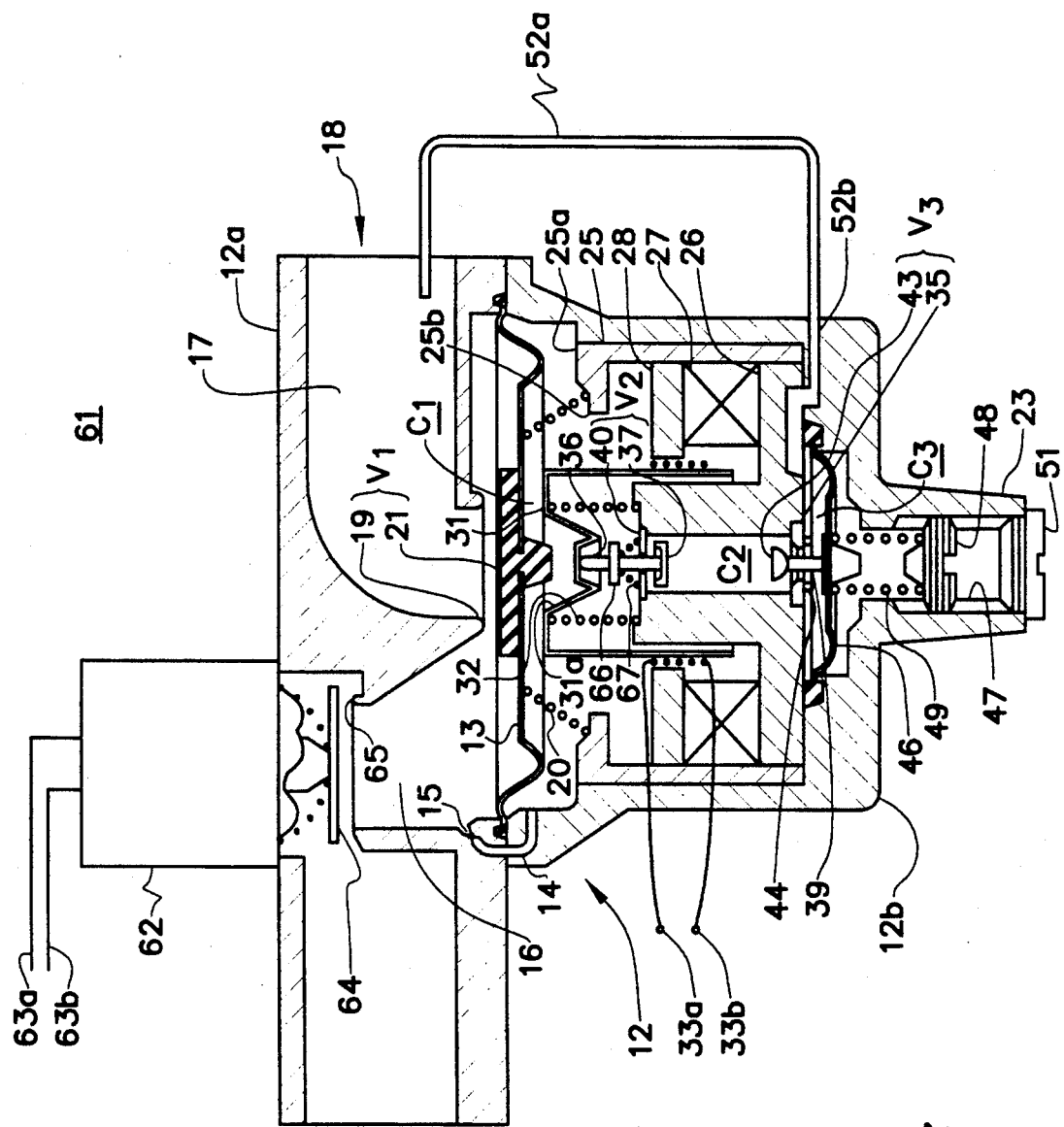
FIG. 3, is a partial sectional view of a gas valve in accordance with the applicant's invention, adapted for on-off operation.

An alternative embodiment which acts as a on-off valve rather than a modulating valve, is shown in FIG. 3. This on-off valve, which is generally identified by the numeral 61, is structurally similar to valve 11, and like numerals identify like components.

Valve 61 includes an automatic safety valve 62 upstream of the inlet passage 16 and in series with valve $V_1$. This safety valve 62, which is also used with valve 11 but does not appear in FIGS. 1 and 2, can be controlled in part by a thermocouple. Valve 62 includes terminals 63a, 63b leading to a remote thermocouple disposed adjacent the pilot flame of the appliance. Safety valve 62 includes a spring that normally urges a valve closure member 64 into engagement with an annular valve seat 65. In the presence of a pilot flame, the thermocouple generates an electrical signal at terminals 63a, 63b, energizing a solenoid to hold valve closure member 64 to the open position shown in FIG. 3.

If the pilot flame is extinguished for any reason, the thermocouple does not generate a signal, the solenoid of safety valve 62 is de-energized and the valve closure member 64 returns to its normally closed position on seat 65.

The principal structural difference between on/off valve 61 and modulating valve 11 is the absence of structure which causes valve $V_2$ to regulate or modulate. Structurally, the tubular member 38 of valve 11 is eliminated from the bottom of valve closure member 37, as is that portion of stem 39 projecting above closure member 43 and spring 42.

In addition, actuator stem 36 is provided with an abutment member 66 disposed intermediate its ends and a small conical spring 67 that is, disposed in compression between the retaining washer 40 and the abutment member 66. As such, there is no mechanical interconnection between valve $V_2$ (components 37, 40) and valve $V_3$ (components 35, 43).

With these structural changes, valve 61 operates in either a fully closed or fully open position. In operation, and assuming that a pilot flame exists to maintain safety valve 62 in an open position, the absence of a control signal at terminals 33a, 33b will cause actuator member 31 to be extended to its upper most position by spring 32, closing valve $V_2$. Pressure equalizes across diaphragm 13, and springs 20, 32 cooperate to close valve $V_1$.

In this state, zero pressure exists in outlet passage 17, which pressure is communicated to the top of diaphragm 46. Without any pressure, spring 49 urges closure member 43 to its upper most position opening valve $V_3$ and maintaining chambers $C_2$, $C_3$ at zero pressure.

When a non-modulating "on" signal appears at terminals 33a, 33b, the coil 33 pulls actuator 31 downward against the bias of springs 32, 67, and valve $V_2$ is opened This immediately decreases the pressure in chamber $C_1$, causing valve $V_1$ to open. Pressure in outlet passage 17 is communicated through passages 52a, 52b to diaphragm 46, maintaining valve $V_3$ in a partially open position. As such, the pressure in chambers $C_1$, $C_2$ and $C_3$ equalizes at a pressure lower than that in inlet passage 16, and valve $V_1$ remains in the open position shown in FIG. 3.

When the non-modulating control signal turns to the "off" level at terminals 33a, 33b, actuator 31 returns to its upper most position, closing valve $V_2$, and pressure equalization across diaphragm 13 will cause valve $V_1$ to close under the influence of springs 20, 32.

With either the valves 11, 61, the combined forces of the springs 20, 32 act to maintain valve $V_1$, in the position determined by the control signal at terminals 33a, 33b, and operation is unaffected by back pressure in the outlet 17. The result for valve 11 is an accurately modulated gas pressure at outlet 18 that varies linearly with the electric control signal, and for valve 61 the result is a positive acting on-off valve.

Although specific embodiments of the applicant's unique gas valve have been shown and described for illustrative purposes, a number of variations and modifications within the applicant's contemplation and teaching will be apparent to those skilled in the relevant arts. The invention for which protection is sought is not to be limited by the disclosed embodiments, but only by the terms of the following claims.

I claim:

1. A gas valve for supplying gas to an appliance, comprising:

housing means defining an inlet passage adapted for connection to a source of gas, an outlet passage adapted for connection to the appliance and valve seat means between the inlet and outlet passages;

diaphragm means disposed in the housing means sealably dividing the inlet and outlet passages from a first control chamber, the diaphragm means being engageable with the valve seat means to define a main flow valve therewith;

first spring means for normally urging the diaphragm means to close said main flow valve;

orifice passage means establishing fluid communication between the inlet passage and first control chamber;

means defining second and third control chambers within said housing means;

first normally closed control valve means disposed between the first and second control chambers;

second normally open control valve means disposed between the second and third control chambers;

electromagnetic actuator means for controllably moving the first control valve means between closed and opened positions in response to an electric signal current;

pressure feedback actuator means for sensing pressure in said outlet passage and moving the second valve means between open and closed positions as a function thereof; and actuator spring means biasing said electromagnetic actuator means so as to normally assist said first spring means in urging aid diaphragm means to close the main flow valve, and so as to permit said first normally closed control valve to remain closed.

2. The gas valve defined by claim 1, wherein the electromagnetic actuator means comprises:

a movable actuator member engageable with said first control valve means;

electric winding means carried by the actuator member and having terminals to receive said electric signal current;

and magnetic conductance means including a permanent magnet for defining an electromagnetic circuit with said actuator member;

the electric winding means and magnetic conductance means being constructed and arranged to move the actuator member as a function of the magnitude of said electric signal current.

3. The gas valve defined by claim 2, wherein said first spring means generates a force sufficient to maintain said main flow valve in a closed position with said first control valve means in its normally closed position.

4. The gas valve defined by claim 2, wherein the first control valve means comprises:

means defining a valve seat;

a valve stem engageable by said actuator member;

a valve closure member connected to said stem and engageable with said valve seat; and second spring means for normally urging the valve closure member into closing engagement with said valve seat.

5. A gas valve comprising:

housing means defining an inlet passage adapted for connection to a source of gas, an outlet passage adapted for connection to gas utilization apparatus and valve seat means between the inlet and outlet passages;

diaphragm means disposed in the housing means sealably dividing the inlet and outlet passages from a first control chamber, the diaphragm means being engageable with the valve seat means to define a main flow valve therewith;

first spring means for normally urging the diaphragm means to close the main flow valve;

orifice passage means establishing fluid communication between the inlet passage and first control chamber;

means defining second and third control chambers within said housing means;

first normally closed control valve means disposed between the first and second control chambers;

second normally open control valve means disposed between the second and third control chambers;

linkage means interconnecting said first and second control valve means causing the second control valve means to progressively close as said first control valve means progressively opens, and for causing said second control valve means to progressively open as said first control valve means progressively closes;

electromagnetic actuator means for controllably moving the first control valve means between closed and opened positions in response to an electric signal current;

pressure feedback actuator means for sensing pressure in said outlet passage and moving the second valve means between open and closed positions as a function thereof.

6. The gas valve defined by claim 5, wherein each of said first and second control valve means comprises a valve seat and a valve closure member, the valve closure members being disposed in substantial co-linear relation, and the linkage means comprises:

second spring means normally urging the valve closure members away from each other, the spring means being disposed so that movement of either closure member toward the other causes said second spring means to generate a spring force on the other;

and link means constructed and arranged so that movement of either closure member away from the other causes both closure members to move linearly and directly together.

7. The gas valve defined by claim 1, wherein the pressure feedback actuator means comprises:

fluid conduit means establishing fluid communication between said outlet passage and said third control chamber;

second diaphragm means in part defining said third control chamber;

and means connecting the second diaphragm means with the second control valve means.

8. The gas valve defined by claim 7, which further comprises third spring means engaging the said second diaphragm means for urging the second control valve means into said normally open position.

9. The gas valve defined by claim 8, which further comprises means for adjusting the spring force of said third spring means.

* * * * *